Figure 1:
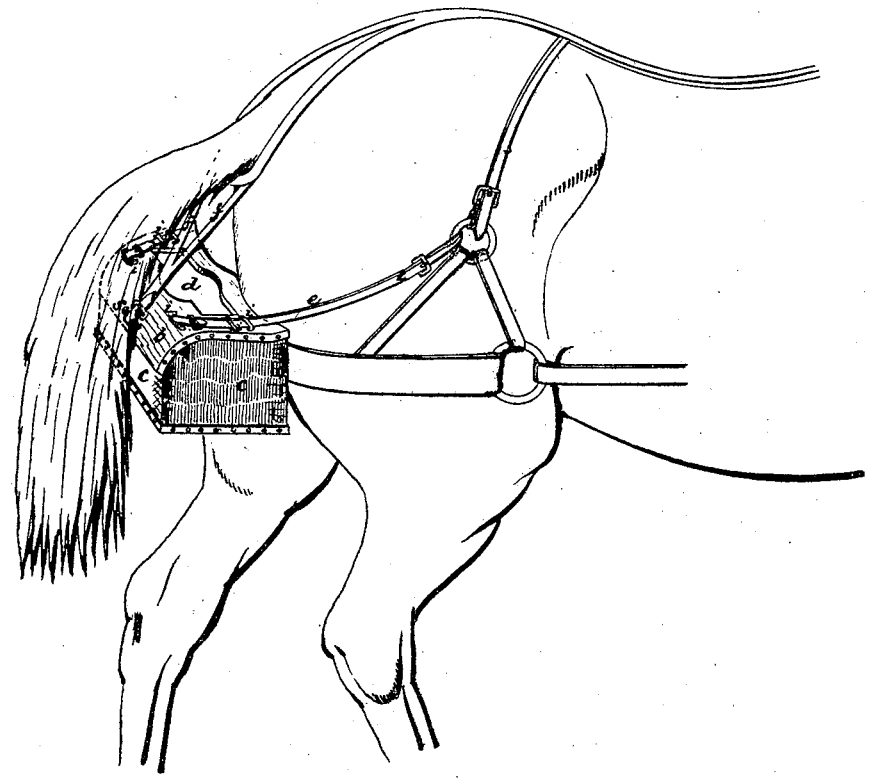

E. BERLINGER.
Improvement in Apparatus for Preventing Animal Deposit in Streets.

No. 133,007.

Patented Nov. 12, 1872.

Witnesses:
E. Wolff
J. Felbel

Inventor:
E. Berlinger.
By his attorney,
J. McIntire

UNITED STATES PATENT OFFICE.

ELICK BERLINGER, OF NEW YORK, N. Y.

IMPROVEMENT IN APPARATUS FOR PREVENTING ANIMAL DEPOSITS IN STREETS.

Specification forming part of Letters Patent No. 133,007, dated November 12, 1872.

*To all whom it may concern:*

Be it known that I, ELICK BERLINGER, of New York, of New York county, in the State of New York, have invented a System and Means for the Prevention of Animal Excrementitious Deposits in Streets, &c.; and I do hereby declare that the following is a full and exact description thereof, reference being had to the accompanying drawing making part of this application.

In large cities the matter of keeping the streets clean is one of great magnitude and sanitary importance, and many thousands of dollars are expended annually in cleansing the main thoroughfares of densely-populated cities of the excrement deposited by the horses which travel there; and as population increases and the cultivation of the soil becomes more extended the question of utilization of all the sources from which manure and fertilizers of different kinds are to be supplied, and the condition in which, and cost at which, they can be derived becomes a very important one and merits serious attention. In some of the larger European cities for a long time, and lately in this country, the utilization of human excrement, by the collection of it merely mixed with fine earth or other deodorizing material for agricultural purposes, has received much attention, and one of the considerations which has led to the investment of capital in the "earth-closet" system and its extensive introduction into public use has been the production at a small cost of a highly-useful fertilizer. In view of these facts alone it seems clear that any means or device by which in large cities the deposit of animal excrementitious filth in the streets can be avoided, and the animal excrement all collected in its natural condition and at little or no expense, must prove of great benefit to the public not only in a sanitary point of view but also in a commercial sense. I propose to accomplish the prevention of the deposit of animal excrementitious matters in the streets, thus avoiding all the nuisance consequent thereto, and saving a great portion of the vast expenditures now necessary to effect its removal, and, at the same time, at little or no expense to effect the collection in a pure or natural condition for fertilizing purposes of all such matter, whereby a new or improved source of supply of a commodity of increasing commercial importance shall be afforded. These great desideratums I propose to gain by collecting the excrementitious deposits of animals as they are made; and to this end and object my invention consists in the use of a suitable device, adapted to be worn by or applied to horses and other animals, composed of a receptacle or receiver provided with suitable means of attachment to the animal, and so constructed that it shall not materially incommode the working of the animal, as I will hereinafter more fully explain.

To enable others to fully understand and use my invention, I will proceed to more fully explain it, referring by letters to the accompanying drawing, in which is illustrated a mode of carrying out my invention such as I have contemplated and think best.

Figure 2:
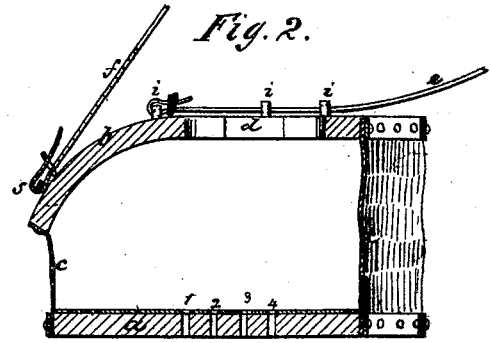

Figure 1 is a perspective view of a portable excrement receptacle, illustrated as being applied to a horse; and Fig. 2, a vertical cross-section of said device or apparatus.

The excrement receiver and holder represented is formed in about the shape shown, which is such as to permit its placement beneath the animal's tail and its retention there without any serious inconvenience, and is composed of a bottom board, $a$, which should be perforated to permit the free passage of water or urine through it, a top board, $b$, which has an opening, $d$, through it of proper shape and dimensions to permit the passage of the deposits, and a flexible portion, $c$, which connects the said upper and lower boards. $i$ and $s$ are metallic staples, secured in the top portion $b$, as shown, and which serve to effect the retention of straps $e\ e$ and $f$, the former two of which may be connected to that part of the harness which sustains the breeching, and the latter one of which, $f$, passes up on either side of the tail and is fastened to the crupper-strap.

I propose to make the top $b$ and bottom $a$ of some sort of wood or other material, and to form the sides or portion $c$ of canvas, rubber cloth, or any other suitable flexible material, so that there shall be a capacity to yield to the motions of the animal, and so that in the event of the horse falling, as frequently happens with horses traveling the smooth pavement of city streets, the box or receiver can partially close up or fold together, bellows fashion, and present less risk of injury to the falling animal.

The perforations at 1, 2, 3, &c., in the bottom *a* are not necessary for the passage of urine, except when the device is designed for use on female animals; but they may serve in all cases a useful end in facilitating the washing out and cleansing of the box.

In the use of my portable animal excrement-receiver or horse-bin the size may be varied under different circumstances; for instance, when designed for use on car and stage horses making regular and comparatively short trips the boxes need not be of so great size and containing capacity as where they are intended for use on animals traveling longer, without change or stoppage; and it will be understood that the pattern or shape, and all the details of construction of the apparatus, as well as its mode of attachment to the animal, may be materially varied from what I have shown without departing from the main feature of my invention, the gist of which rests in the idea of a suitable receiver, adapted to be carried by the animal.

The feature of flexibility in the device may be embodied under various modifications of construction.

It will be seen that by my invention all deposits of animal excrement in the streets may be prevented, and a means afforded for the collection of all such matter free from admixture with trash and other dirt, and in a condition such as to render it of great value for fertilizing purposes, and this with little expense or trouble.

In the practical application of my system many changes in form and operation may be suggested by practice and experience; I do not, therefore, wish to be understood as limiting my claim of invention to the particular form and details of construction shown; but Having fully explained the nature and objects of my invention and pointed out the mode in which I contemplate its practical application, what I claim as new, and desire to secure by Letters Patent, is—

A portable excrement receptacle for animals, constructed and adapted to operate substantially as hereinbefore set forth.

In testimony whereof I have hereunto set my hand and seal this 12th day of October, 1872.

ELICK BERLINGER. [L. S.]

In presence of—
 J. N. McINTIRE,
 J. FELBEL.